(12) United States Patent
Maile (10) Patent No.: US 10,745,249 B2
(45) Date of Patent: Aug. 18, 2020

(54) RECEIVING BASKET FOR A LIFTING DEVICE AS WELL AS METHOD FOR FEEDING A FOOD PROCESSING MACHINE

(71) Applicant: ALBERT HANDTMANN MASCHINENFABRIK GMBH & CO. KG, Biberach (DE)

(72) Inventor: Bernd Maile, Oggelshausen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 754 days.

(21) Appl. No.: 15/171,407

(22) Filed: Jun. 2, 2016

(65) Prior Publication Data

US 2016/0368742 A1 Dec. 22, 2016

(30) Foreign Application Priority Data

Jun. 19, 2015 (EP) .................................... 15172845

(51) Int. Cl.
| | |
|---|---|
| *B65G 65/23* | (2006.01) |
| *A22C 11/02* | (2006.01) |
| *B66C 3/00* | (2006.01) |
| *A22C 11/00* | (2006.01) |

(52) U.S. Cl.
CPC ................ *B66C 3/00* (2013.01); *A22C 11/00* (2013.01); *B65G 65/23* (2013.01)

(58) Field of Classification Search
CPC .......... B65G 65/23; B65G 69/18; A22C 11/00
See application file for complete search history.

(56) References Cited

U.S. PATENT DOCUMENTS

| | | | | |
|---|---|---|---|---|
| 4,520,718 | A * | 6/1985 | Prosenbauer | B65G 65/23 366/185 |
| 4,953,262 | A * | 9/1990 | Zinser | A22C 11/00 254/3 R |
| 6,095,572 | A | 8/2000 | Ford et al. | |
| 9,089,147 | B2 * | 7/2015 | Maile | A22C 11/02 |
| 2005/0269364 | A1 * | 12/2005 | Gibson | B65G 65/23 222/181.1 |
| 2011/0310141 | A1 | 12/2011 | Takahashi et al. | |

(Continued)

FOREIGN PATENT DOCUMENTS

| | | | | |
|---|---|---|---|---|
| DE | 19500326 | * | 7/1996 | ............. A22C 11/00 |
| DE | 19500326 A1 | | 7/1996 | |

(Continued)

OTHER PUBLICATIONS

European Patent Office, Notification of an Opposition Issued in Application No. 15172845.8, Aug. 13, 2019, Germany, 712 pages
(Continued)

*Primary Examiner* — Dana Ross
*Assistant Examiner* — Lawrence H Samuels
(74) *Attorney, Agent, or Firm* — McCoy Russell LLP (57) ABSTRACT

The present disclosure relates to a receiving basket for a lifting device of a food processing machine, in particular a filling machine with a lifting device, whereby the receiving basket receives the meat trolley, as well as a respective method. The receiving basket or the meat trolley has a sealing element that enables a sealing point between the receiving basket and the meat trolley.

16 Claims, 6 Drawing Sheets

(56) References Cited

U.S. PATENT DOCUMENTS

| | | | | |
|---|---|---|---|---|
| 2012/0207566 | A1* | 8/2012 | Maile | A22C 11/02 414/222.02 |
| 2015/0091992 | A1 | 4/2015 | Kopp et al. | |
| 2015/0109367 | A1 | 4/2015 | Ros Cerro et al. | |
| 2016/0368742 | A1 | 12/2016 | Maile | |
| 2017/0313096 | A1 | 11/2017 | Meyer et al. | |
| 2018/0022092 | A1 | 1/2018 | Mori | |
| 2018/0281462 | A1 | 10/2018 | Herrmann et al. | |

FOREIGN PATENT DOCUMENTS

| | | |
|---|---|---|
| EP | 3106035 A1 | 12/2016 |
| EP | 3106035 B1 | 9/2018 |
| SU | 624847 A1 | 9/1978 |

OTHER PUBLICATIONS

"Characteristic Analysis," Other Evidence Document A3 Cited in Notice of Opposition Issued in Application No. 15172845.8, Aug. 13, 2019, Munich, Germany, 2 pages.
"DIN9797," Other Evidence Document E4 Cited in Notice of Opposition Issued in Application No. 15172845.8, Aug. 13, 2019, Munich, Germany, 4 pages.
"Lifting and Charging Trolley MOHN," Other Evidence Document E4.1 Cited in Notice of Opposition Issued in Application No. 15172845.8, Aug. 13, 2019, Munich, Germany, 1 page.
"Website Mohn GmbH" Other Evidence Document E5 Cited in Notice of Opposition Issued in Application No. 15172845.8, Aug. 13, 2019, Munich, Germany, 1 page.
"Spare parts catalogue of the MRG 400," Other Evidence Document E6 Cited in Notice of Opposition Issued in Application No. 15172845.8, Aug. 13, 2019, Munich, Germany, 105 pages.
"Spare part Ikata log MGR 900," Other Evidence Document E7 Cited in Notice of Opposition Issued in Application No. 15172845.8, Aug. 13, 2019, Munich, Germany, 116 pages.
"Catalog MGR 400-900," Other Evidence Document E8 Cited in Notice of Opposition Issued in Application No. 15172845.8, Aug. 13, 2019, Munich, Germany, 4 pages.
"Extract from the Internet as evidence Katalog MRG 400 and 900 Original" Other Evidence Document E8a Cited in Notice of Opposition Issued in Application No. 15172845.8, Aug. 13, 2019, Munich, Germany, 1 page.
"Spare parts catalogue MRG 1500," Other Evidence Document E9 Cited in Notice of Opposition Issued in Application No. 15172845.8, Aug. 13, 2019, Munich, Germany, 117 pages.
"Catalog MRG 1500," Other Evidence Document E10 Cited in Notice of Opposition Issued in Application No. 15172845.8, Aug. 13, 2019, Munich, Germany, 1 page.
"Extract from the Internet as evidence MRG 1500," Other Evidence Document E10a Cited in Notice of Opposition Issued in Application No. 15172845.8, Aug. 13, 2019, Munich, Germany, 1 page.
"Design drawings (Schütte_110674)," Other Evidence Document E11a Cited in Notice of Opposition Issued in Application No. 15172845.8, Aug. 13, 2019, Munich, Germany, 1 page.
"Extract of the website with machines offered," Other Evidence Document E11b Cited in Notice of Opposition Issued in Application No. 15172845.8, Aug. 13, 2019, Munich, Germany, 1 page.
"Delivery note MGR 400," Other Evidence Document E11d Cited in Notice of Opposition Issued in Application No. 15172845.8, Aug. 13, 2019, Munich, Germany, 1 page.
"Excerpt from the website of Rühle GmbH MRG 400," Other Evidence Document E11e Cited in Notice of Opposition Issued in Application No. 15172845.8, Aug. 13, 2019, Munich, Germany, 2 pages.
"Brief Installation Instructions Operating Instructions MGR-400_06-42-EG," Other Evidence Document E11f Cited in Notice of Opposition Issued in Application No. 15172845.8, Aug. 13, 2019, Munich, Germany, 2 pages.
"Original Operating Instructions (Operating Instructions MGR-400_06-42-EG)," Other Evidence Document E11g Cited in Notice of Opposition Issued in Application No. 15172845.8, Aug. 13, 2019, Munich, Germany, 19 pages.
"Construction drawings Schütte_110674," Other Evidence Document E12a Cited in Notice of Opposition Issued in Application No. 15172845.8, Aug. 13, 2019, Munich, Germany, 1 page.
"Excerpt of the website with offered machines—Rühle 2013," Other Evidence Document E12b Cited in Notice of Opposition Issued in Application No. 15172845.8, Aug. 13, 2019, Munich, Germany, 1 page.
"Delivery note MGR 900," Other Evidence Document E12d Cited in Notice of Opposition Issued in Application No. 15172845.8, Aug. 13, 2019, Munich, Germany, 1 page.
"Excerpt from the website of Rühle GmbH MRG 900," Other Evidence Document E12e Cited in Notice of Opposition Issued in Application No. 15172845.8, Aug. 13, 2019, Munich, Germany, 2 pages.
"Brief Installation Instructions Operating Instructions MRG-900_06-42-EG," Other Evidence Document E12f Cited in Notice of Opposition Issued in Application No. 15172845.8, Aug. 13, 2019, Munich, Germany, 2 pages.
"Original Operating Instructions (Operating Instructions MGR-900_06-42-EG)," Other Evidence Document E12g Cited in Notice of Opposition Issued in Application No. 15172845.8, Aug. 13, 2019, Munich, Germany, 19 pages.
"Design drawings Schütte_110674," Other Evidence Document E13a Cited in Notice of Opposition Issued in Application No. 15172845.8, Aug. 13, 2019, Munich, Germany, 1 page.
"Extract of the website with machines offered—Rühle 2013," Other Evidence Document E13b Cited in Notice of Opposition Issued in Application No. 15172845.8, Aug. 13, 2019, Munich, Germany, 1 page.
"Delivery note_MGR 1500," Other Evidence Document E13d Cited in Notice of Opposition Issued in Application No. 15172845.8, Aug. 13, 2019, Munich, Germany, 1 page.
"Excerpt from the website of Rühle GmbH MRG 1500," Other Evidence Document E13e Cited in Notice of Opposition Issued in Application No. 15172845.8, Aug. 13, 2019, Munich, Germany, 2 pages.
"Brief Installation Instructions Operating Instructions MGR-1500_06-42-EG," Other Evidence Document E13f Cited in Notice of Opposition Issued in Application No. 15172845.8, Aug. 13, 2019, Munich, Germany, 2 pages.
"Original Operating Instructions (Operating Instructions MGR-1500_06-42-EG)," Other Evidence Document E13g Cited in Notice of Opposition Issued in Application No. 15172845.8, Aug. 13, 2019, Munich, Germany, 20 pages.

* cited by examiner

2002 — Inserting and fastening of a meat trolley filled with pasty substance in a receiving basket of the lifting device whereby a long sealing point is formed at least between an external wall of the meat trolley and a respective opposite side of the receiving basket

↓

2004 — Lifting and emptying of the meat trolley into the food processing machine

↓

2006 — Lowering and removing of the meat trolley from the receiving basket

RECEIVING BASKET FOR A LIFTING DEVICE AS WELL AS METHOD FOR FEEDING A FOOD PROCESSING MACHINE

CROSS REFERENCE TO RELATED APPLICATION

The present application claims priority to European Patent Application No. 15 172 845.8, entitled "RECEIVING BASKET FOR A LIFTING DEVICE AS WELL AS METHOD FOR FEEDING A FOOD PROCESSING MACHINE," filed Jun. 19, 2015, the entire contents of which is hereby incorporated by reference for all purposes.

TECHNICAL FIELD

The present disclosure relates to a receiving basket for a lifting device for receiving, lifting, and emptying of a meat trolley. The present disclosure further relates to a method for feeding a food processing machine.

BACKGROUND AND SUMMARY

In the food industry, lifting devices are used for feeding food processing machines, for example filling machines, in particular vacuum filling machines or cutters. These lifting devices are usually formed as arm-operated lifting devices or as mast lifting devices and can be installed on a machine, for example a filling machine or a cutter, or also be formed as an independent unit ("stand-alone unit"). These lifting devices are designed to receive partially standardized containers, i.e. so-called meat trolleys. The meat trolleys are equipped with rollers. In this, the meat trolley is typically inserted in the receiving unit of the lifting device in a way that it is locked securely against falling out, i.e. that it is held in a firm position and that it is brought upwards with the lifting unit through a filling funnel of a filling machine. There, the meat trolley will then be tilted and emptied into the filling funnel. Subsequently, the meat trolley is brought back into the starting position by means of the lifting device and taken back out by the operator through release of the lock on the lifting device. During feeding of cutters, the cutter bowl is fed accordingly.

During transport of the full meat trolley to the machine over a mostly wet floor, the wheels and an undertray of the trolley, may be covered with contaminated spray water from the floor. During the feeding process, the meat trolley is located upside down above the aperture of the filling funnel. Thereby, the spray water or condensate at the outer walls of the container on the undertray of the meat trolley and in the wheel area can flow down over the external walls of the meat trolley and enter the filling funnel and contaminate the content.

A lifting device with a cover device in form of a hinged hood to prevent impurities of the meat trolley from entering the funnel is already known from the DE 195 00 326 A1. The cover device has several folding plates that start on the upper meat trolley edge. Here, in particular the hygiene of the folding mechanism as well as the high workload and the high manufacturing costs are disadvantageous. Besides, there are additional risks due to the danger of body parts, e.g. fingers, getting caught/squeezed. In addition, each cover device is only suitable for a specific meat trolley type.

Starting from this, the present disclosure is based on the purpose of providing a receiving basket and/or a lifting device as well as a respective method that prevents contamination of the food product during the feeding process by the spray water from the floor in a simple, reliable and cost-efficient way.

According to the present disclosure, the receiving basket for a lifting device has a sealing element that can lay itself onto at least one external wall of the meat trolley. When the meat trolley is tilted in an upper position, the sealing element prevents spray water from the floor area or the edges of the meat trolley or condensate from flowing into the funnel in such a way that the food product can be filled into a filling funnel. The sealing element is installed on the receiving basket in a way that, when the meat trolley is received by the receiving basket and sealed mechanically, the sealing element can lay itself in a sealing way onto at least one external wall of the sealing trolley. Thereby, the sealing element presses onto the external wall of the meat trolley in a way that reliable sealing is ensured. According to the present disclosure, no extra step is required for sealing, but sealing occurs automatically during insertion and attachment and/or locking of the meat trolley. Hence, sufficient sealing against spray water flowing down is always ensured. A respective sealing element on the receiving basket can be provided simply and cost-efficiently. The sealing element can thereby be fastened in a simple manner on the side surface that faces the meat trolley and/or on the upper and/or the lower surface of the receiving basket.

It is particularly preferable when the sealing element is formed as a sealing strip. A respective longish sealing strip, i.e. a drip protection strip, can be manufactured and fastened on the receiving basket in a simple way. The sealing strip is thereby designed so as to extend over the total length of the meat trolley at least on a tilting side.

Preferably, the sealing strip is formed at least in part of a flexible material. The flexible material comes with the advantage that the meat trolley can put pressure on the sealing element whereby the sealing function is improved. The form and manufacturing tolerances as well as deformations of the meat trolley can be compensated thereby. Preferably, the flexible material of the sealing element can be one of the group of elastomers.

Particularly preferably, the sealing element has a flexible sealing lip that can press on the meat trolley in order to achieve a particularly good sealing effect.

The receiving basket is preferably formed as a U-shaped support structure, whereby the sealing element extends at least along one of the three sides of the support structure. Preferably at least along the tilting side. The tilting side is the side of the receiving basket that faces the machine and that is oriented in a downward direction during a tilting movement; here the side that is opposite to the open side of the U-shaped support structure. Embodiments also for instance exist in which the opening of the U points towards the operator side, in this case the tilting side adjoining the open side. If a sealing element, in particular a sealing strip, is provided at least along the tilting side, waste water can be prevented effectively from flowing from the floor and/or the rollers of the meat trolley into the funnel.

Advantageously, the sealing element extends along multiple sides of the support structure. The sealing element can thereby comprise either multiple individual sealing strips or also be formed as a continuous L- or U-shaped sealing strip.

Advantageously, the sealing strip is formed in a way that a gutter can be formed between the receiving basket and the meat trolley. Therefore, spray water can be collected in the gutter when the meat trolley is tilted for emptying. The spray water can for example be guided from the gutter behind the machine to the floor already during the tilting process. Due to the sealing element being located on the receiving basket, the gutter seal and/or gutter is implemented in the lower area, i.e. lower third of the meat trolley. If then, for example, a respective gutter is implemented on the tilting side by means of the sealing strip, this area will always be outside of the funnel so that drained spray water cannot flow into the funnel.

It can thereby be advantageous if the gutter is situated preferably at an angle to the longitudinal axis of the respective side of the receiving basket, i.e. at least sectionally. This means that, viewed for example in an initial position of the meat trolley, the sealing strip is situated at an angle α in relation to the horizontal line. In the inclined version of the sealing strip, the spray water can be drained out of the critical area even better.

It is also possible for the sealing strip to have lateral sealing elements that seal the gutter laterally. Thereby, the sealing strip can be sealed respectively on one side of the receiving basket, or rather the respective end pieces in case of L- or U-shaped sealing strips. Then, the collected spray water will only flow out of the gutter onto the floor if the emptied meat trolley is lowered, i.e. when the meat trolley is tilted back.

The sealing element is preferably installed in a replaceable way. This comes with the advantage that the sealing elements can be removed easily for cleaning purposes. However, it is also possible that different strips are to be provided for different applications and that they can be replaced accordingly. Therefore, there can for example be a simple adaptation to different meat trolley geometries.

According to the present disclosure, a lifting device for receiving, lifting and emptying of a meat trolley in a food processing machine comprises a drive, a lifting element, e.g. a lifting arm or lifting mast. The lifting device further has a receiving basket connected to the lifting element for receiving a meat trolley.

A filling machine according to the present disclosure for filling of a pasty substance has a funnel for filling the pasty mass, a conveyer system to convey the pasty mass and a filling organ, in particular a filling pipe. A relevant filling machine has the lifting device according to the present disclosure that was mentioned before.

To implement a sufficient seal between meat trolleys and the receiving basket, it is alternatively also possible that the sealing element, e.g. the sealing strip, is not fastened on the receiving basket but instead on the external wall of the meat trolley so that the sealing element can lay itself onto at least one side of a receiving basket of a lifting device of the food processing machine. Thereby, the sealing element is, just as in the preceding embodiments, disposed in the lower third of the meat trolley. Consequently, a sufficient sealing effect can be achieved as well in a simple way and automatically if the meat trolley is inserted and fastened and/or locked in the receiving basket.

The following steps are to be provided in the method according to the present disclosure for feeding a food processing machine, in particular a filling machine:

inserting and fastening of a meat trolley filled with pasty substance in a receiving basket of the lifting device, whereby a long sealing point is formed at least between an external wall of the meat trolley and a respective opposite side of the receiving basket. Thereby, a sealing element, in particular a sealing strip, can be provided, as described before, either on the receiving basket or rather on the meat trolley.

The meat trolley is subsequently lifted and emptied. Then, the meat trolley is lowered and removed, i.e. unlocked and moved away.

As a gutter is formed between the receiving basket and the meat trolley, the spray water can flow from the floor of the meat trolley into the gutter while the meat trolley is swiveled for the emptying process. Therefore, it is ensured that this spray water cannot flow into the funnel. The sealing element is installed on the receiving basket or the meat trolley in a way that a correct sealing function is ensured. In one example, a gutter extends at least along the total width of the meat trolley side on the tilting side.

As described before, the sealing element can be fastened either on the receiving basket or on the meat trolley for the implementation of the seal and/or the gutter. The special features described for the sealing element in connection with the receiving basket shall apply in the same way for the formation of the sealing element if it is fastened on the meat trolley. Both embodiments allow for the existence of a sealing point between the receiving basket and the meat trolley in the lower area of the meat trolley in order to prevent spray water from flowing into the funnel when the meat trolley is tilted. The embodiment in which the sealing element is fastened on the receiving basket may be advantageous, as only one measure will be necessary on the receiving basket and as not every single meat trolley will have to be equipped accordingly.

The gutter extends at least on the tilting side along the total width of the meat trolley. On the other sides, a respective gutter can also be formed in a slightly shorter way.

The receiving basket and/or the lifting device also has a latching device that locks and fastens the meat trolley in a way that the lateral surface of the container has a predefined distance from the surface of the receiving basket that faces the container, i.e. that it is located in a predefined position. Then, i.e. when the meat trolley is not installed, the sealing element has a width that is larger than this distance. This means that a pressure is applied on the sealing element in the installed state in a way that a sufficient sealing effect is ensured.

According to the present disclosure the sealing element can also be formed as an inflatable element. This is particularly advantageous as meat trolleys with different geometries can be used by different factories or meat trolleys, and this can have severe traces of use, i.e. they can be severely deformed. An inflatable sealing element can ideally adapt to the outer contour of the meat trolley and thereby ensure a reliable sealing. It is also possible that the sealing element is not fully inflated before inserting the meat trolley, and once the meat trolley is fully inserted, which can be detected for instance by a switch or a lock or sensor, it can be fully inflated.

BRIEF DESCRIPTION OF THE FIGURES

In the following, the present disclosure will be explained in greater detail with reference to the following Figs..

DETAILED DESCRIPTION

FIGS. 1-19B show example configurations with relative positioning of the various components. As shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures. In some examples, top/bottom, upper/lower, above/below, may be used to describe positioning of elements of the figures relative to one another. As such, elements shown above other elements are positioned vertically above the other elements, in one example. For reference, a vertical axis 16 is illustrated for application to FIGS. 1-2, 5-6, 9-11, and 14-15, where the vertical axis 16 points a direction opposite of gravity in these figures.

Figure 1:
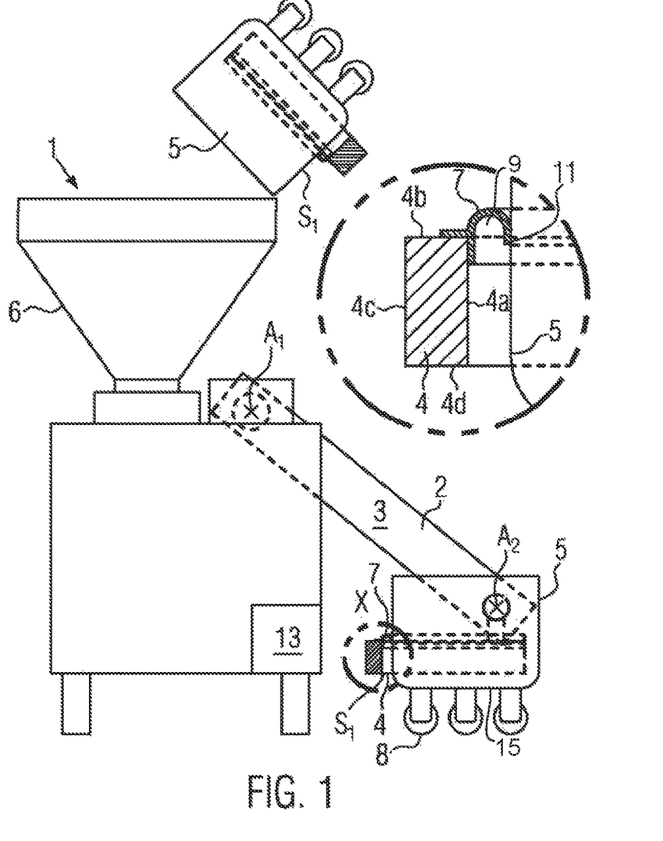
FIG. 1 shows a rough schematic view of a filling machine with a partial section through the receiving basket according to an embodiment of the present disclosure.

FIG. 1 shows a preferred embodiment for a food processing machine, here a filling machine, in particular a vacuum filling machine for sausage production with a lifting device 2, here in form of an arm-operated lifting device. However, a mast lifting device is just as suitable. Here, the lifting device 2 is connected to the filling machine 1. The lifting device 2, however, could also be formed as a stand-alone unit. Also, the device is just as suitable for feeding for example a cutter.

The filling machine has a funnel 6 into which pasty substance is filled from a meat trolley, as well as a conveyor system under the funnel, which is not shown here, that transports the pasty substance into a filling organ, for example a filling pipe.

Figure 2:
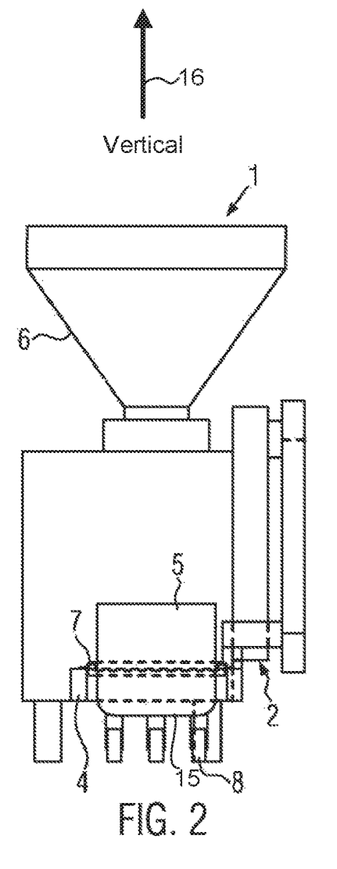
FIG. 2 shows a front view of the filling machine shown in FIG. 1.

The pasty substance is supplied by the meat trolley 5. The meat trolley has for example a filling volume in a range of 100 to 1000 liters. Here, the meat trolley has a floor 15 and rollers 8 and is movable. The meat trolley 5 is received in the lifting device 2 by a receiving basket 4, here in form of a U-shaped support structure 4, and fastened by means of a latching device 12 (see FIGS. 19A, B) in a way that it is locked securely against falling out. This fastening can occur for example through snapping in of the container in the receiving basket 4. Also, a sensor that detects whether the meat trolley 5 is disposed and locked in the receiving basket 4 can be provided for. As can be seen in FIGS. 1 and 2, the receiving basket is disposed on the lifting element 3, here the lifting arm 3. The arm 3 is disposed tiltably around an axis A1 to perform a lifting and lowering movement. For emptying, the container 5 can be swiveled and/or tilted around the axis A2 in relation to the arm 3 by means of a swiveling mechanism that is not explained any further. A lifting and swiveling movement can also be overlaid during operation of the device.

The lifting device also has at least one drive 13 for the lifting and swiveling movement. The drive can for example be a hydraulic drive.

Figures 18, 19A:
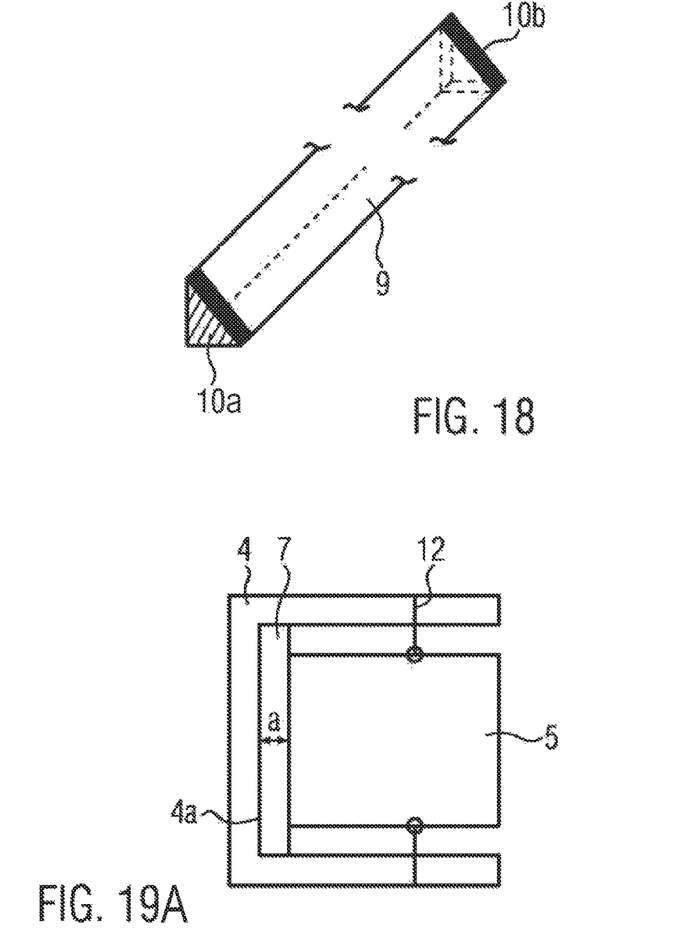
FIG. 18 shows a schematic perspective view of a sealing strip with lateral sealing elements.
FIG. 19A shows a rough schematic top view of a receiving basket with an inserted meat trolley.

According to the present disclosure, the receiving basket 4 has a sealing element 7 that seals at least one external wall of the meat trolley 5. In the FIG. 1-3, the sealing element 7 extends along the overall side S1, i.e. the tilting side of the receiving basket and at least in part along the sides S2 and S3 of the receiving basket 4 that are adjacent to the tilting side S1. No sealing element is disposed on the side S4 that is opposite to the tilting side. Here, the sealing element has a continuous U-shaped form. The sealing element can lay itself in a sealing way onto the respective side wall of the meat trolley 5. As can be seen in particular in FIG. 19A, B, the meat trolley is fastened and held by the latching device 12 in a way that the side surfaces of the meat trolley have a respective predetermined distance a from the surface of the receiving basket 4 that faces the meat trolley. As can be seen in FIG. 19A, also the compressed flexible sealing element 7 will then have this dimension a. In the non-installed state of the meat trolley 5, the sealing element has a width b, in a direction viewed from a perpendicular perspective in relation to the surface 4a that faces the container, which is larger than the distance a. Hence, a pressure is put automatically on the sealing element 7, i.e. the sealing strip in this case, when the container is inserted.

The sealing element 7 prevents spray water from flowing from the floor area 15 or from the wheels 8 of the meat trolley 5 into the funnel 6 and from contaminating the food product when the meat trolley is tilted in an upper position. In one example, the meat trolley 5 may be tilted toward the funnel 6 after being lifted to the upper position in order to empty the contents of the meat trolley 5 into the funnel 6. Hence, an automatic seal is formed according to the present disclosure with the integration and the locking of the meat trolley. A respective sealing element 7 can be implemented in the receiving basket 4 easily and cost-efficiently. The sealing element can thereby be fastened in a simple way on the side surface 4a that faces the meat trolley 5 and/or on the upper side surface 4b and/or the lower side surface 4d. As can be taken from FIG. 1, the sealing element 7 is fastened in this case on the upper surface 4b as well as on the surface 4a that faces the container and has a curved section with a sealing lip 11, whereby the sealing lip 11 presses against the container wall 5. Here, the sealing element has a U-shaped sealing strip section.

The sealing element 7 is in particular formed at least in part of a flexible material. This means that at least the sealing lip 11 is formed of a flexible material. The flexible material can for example include one of the groups of elastomers.

The sealing element and/or the sealing strip 7 is formed in a way that a gutter 9 can form between the receiving basket 4 and the meat trolley 5. Therefore, the spray water can be collected in the gutter 9 when the meat trolley is tilted for emptying as shown in FIG. 1. For example, the spray water can already be guided out of the gutter 9 to the floor behind the machine during the tilting process. The sealing element 7 is located on the receiving basket and consequently a seal is implemented in the lower area, i.e. in the lower third of the meat trolley.

Figures 5, 6, 7, 8, 9:
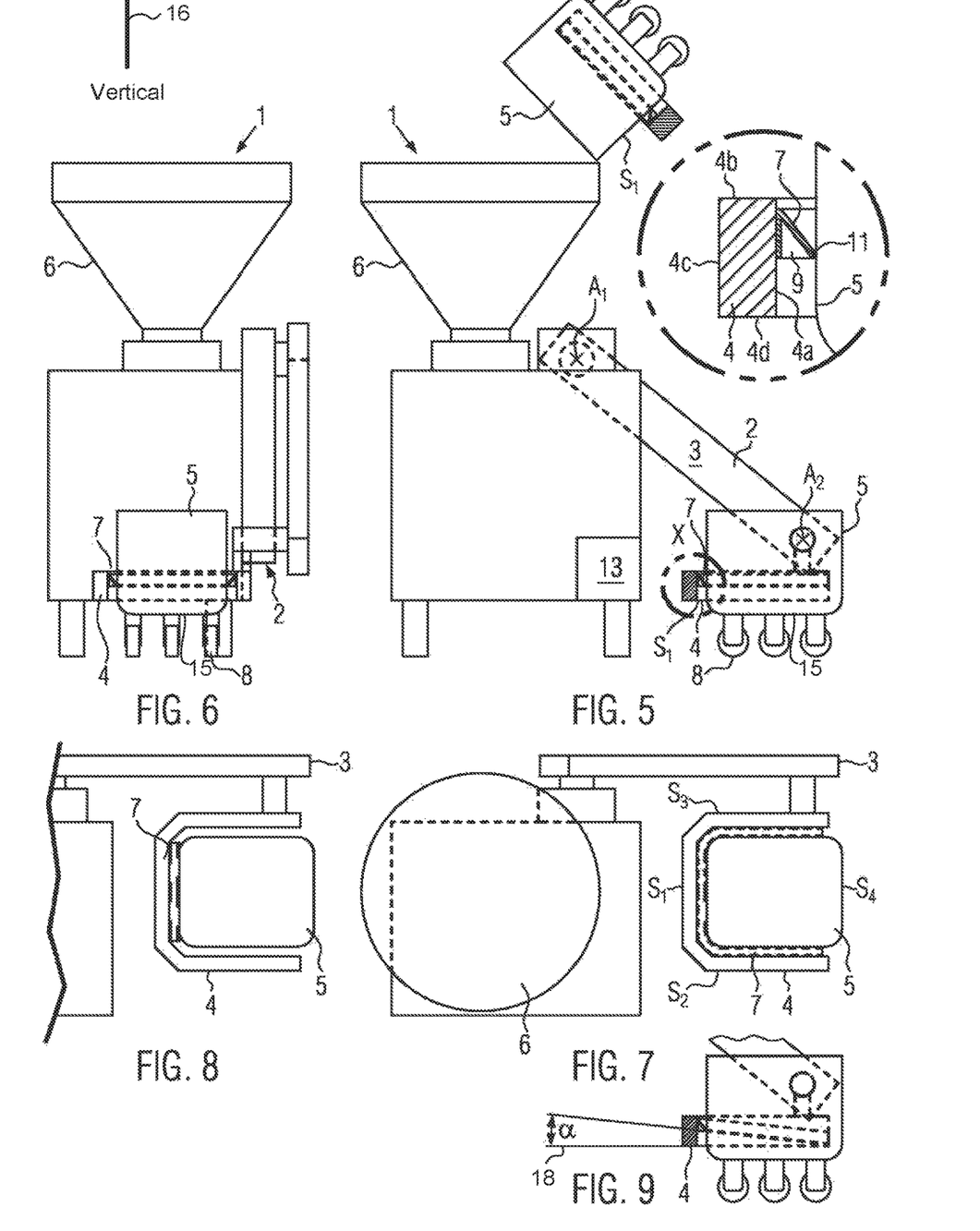
FIG. 5 shows a section through a further embodiment of the present disclosure.
FIG. 6 shows the front view of the embodiment shown in FIG. 5.
FIG. 7 shows a top view of the embodiment shown in FIGS. 5 and 6.
FIG. 8 shows a top view of the embodiment shown in FIGS. 5 to 7, whereby the sealing element extends only along the tilting side.
FIG. 9 shows a rough schematic section through a further embodiment of the present disclosure with an inclined sealing element.

It can be advantageous if the gutter is positioned preferably at least in sections under an angle α in relation to the longitudinal axis of the respective side of the receiving basket as shown for example in FIG. 9. This means that for example in an embodiment of the meat trolley, i.e. when it stands on the floor, the sealing strip 7 is positioned under an angle of α of 1-5° in relation to the horizontal line 18. The strip is positioned at least in sections under a respective angle, i.e. so that the gutter is inclined at least on one side S1, S2 or S3 of the receiving basket or that the strip is inclined only in sections on one side. The gutter can also be arranged transversely extending from a central portion in two directions.

Figure 4:
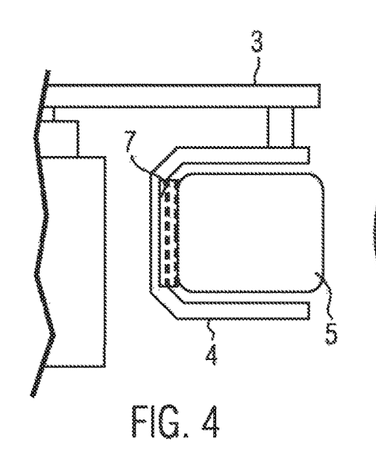
FIG. 4 shows the embodiment shown in FIGS. 1 to 3 with a sealing element that extends only along one side of the receiving basket.

The sealing element preferably extends at least along the tilting side S1 of the receiving basket. The tilting side is the side of the receiving basket 4 that faces the machine 1 and that points downwards during the tilting movement; here, the side that is opposite to the open side S4 of the U-shaped support structure. If a sealing element, in particular a sealing strip, is provided at least along the tilting side S1, it can be avoided effectively that waste water flows from the floor 15 or the rollers 8 of the meat trolley into the funnel. FIG. 4 shows a respective embodiment in which the sealing element is only disposed on the tilting side S1 and extends along the total length of the respective meat trolley side.

It is also possible for the sealing strip to have lateral sealing elements 10a, 10b, as illustrated in FIG. 18, which seal the gutter 9 laterally. Thereby, the sealing strip can be sealed respectively on one side of the receiving basket 4, or rather the respective end pieces in case of L- or U-shaped sealing strips (not illustrated). In this embodiment, the collected spray water will only flow out of the gutter 9 onto the floor during lowering of the emptied meat trolley 5, i.e. when the meat trolley is tilted back and lowered, and not already during emptying, which increases hygiene even further.

The sealing element 7 is preferably installed in a replaceable way. The sealing element can thereby be inserted for example in a rail that is fastened on the receiving basket 4. This comes with the advantage that the sealing element 7 can be removed easily for cleaning purposes. However, it is also possible that different sealing elements and/or sealing strips 7 are to be provided for different applications and that they can be replaced easily. For example, a simple adaptation can be made on different meat trolley geometries. Further devices for replaceable fastening can be for example a magnetic connection, snap fit, plug connection, bayonet fitting, etc.

Figure 3:
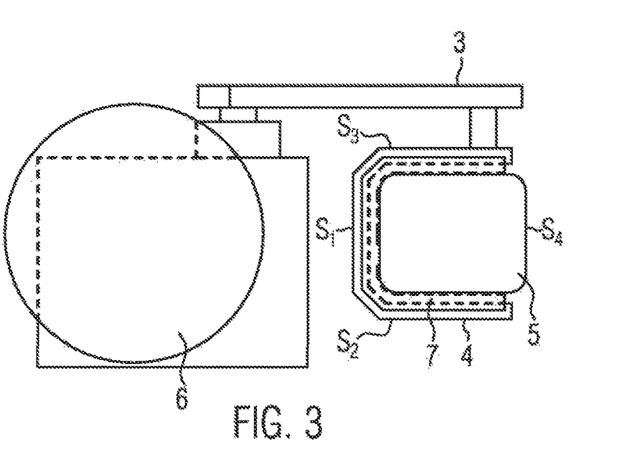
FIG. 3 shows a top view of the device shown in FIG. 1.

FIGS. 5 to 7 essentially correspond to FIGS. 1 to 3 whereby, however, the sealing element 7 is formed slightly differently as can be seen in FIG. 5. Here, the sealing element 7 and/or the sealing strip has two sides in the cross-section, whereby one side is fastened on the surface(s) 4a of the receiving basket that faces the meat trolley and the other side comprises the sealing lip 11 that, as described before, presses against the meat trolley 5. Also here, a gutter is formed between the surface(s) of the receiving basket that face the respective sides of the meat trolley 5 and the respective meat trolley sides as explained in greater detail before. Also in this embodiment, the sealing element can either be U- or L-shaped or at least extend along the side S1 of the receiving basket and/or of the meat trolley 5 that corresponds to the tilting side.

Figure 10:
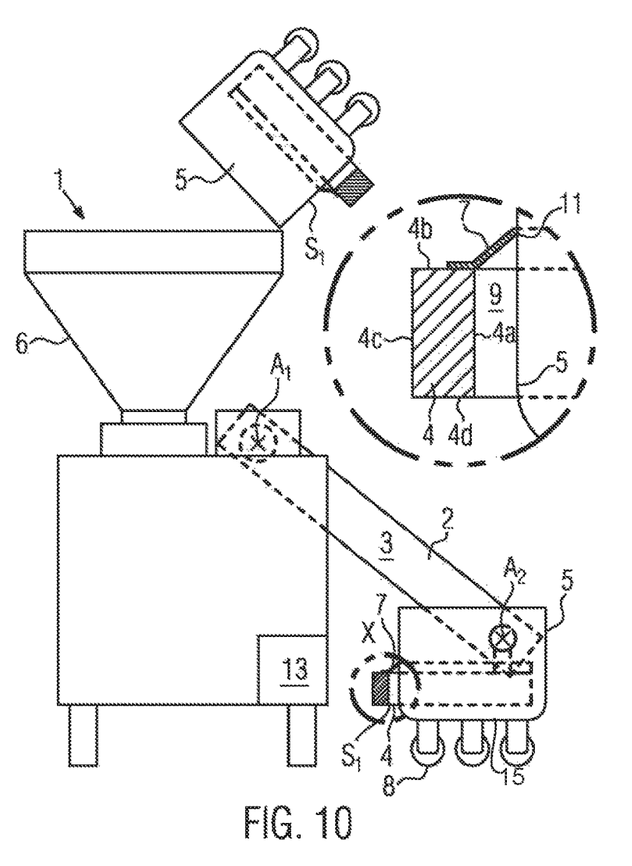
FIG. 10 shows a rough schematic section through a further embodiment of the present disclosure.
Figure 11:
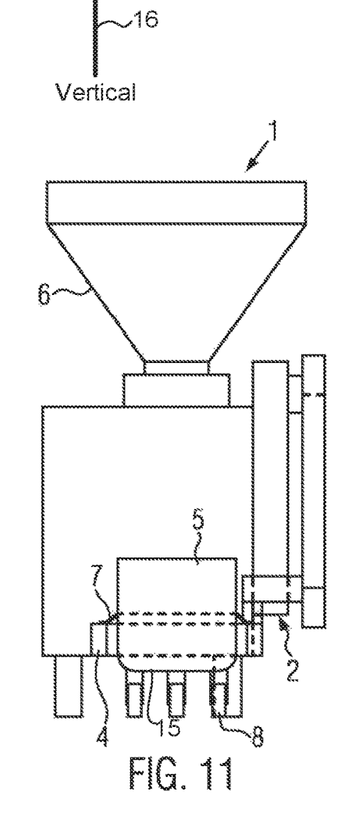
FIG. 11 shows a front view of the embodiment shown in FIG. 10.
Figure 12:
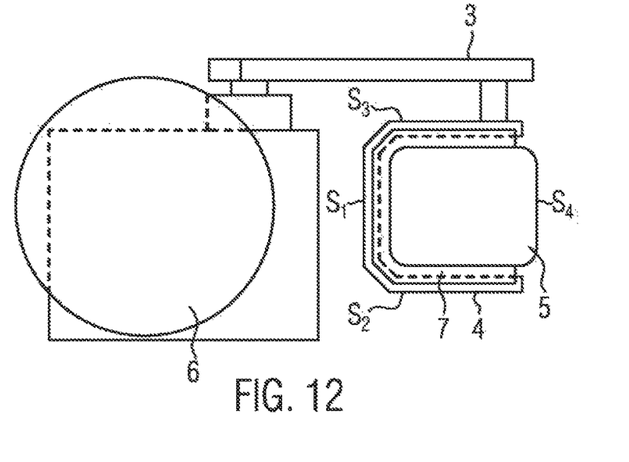
FIG. 12 shows a top view of the embodiment shown in FIGS. 10 and 11.
Figure 13:
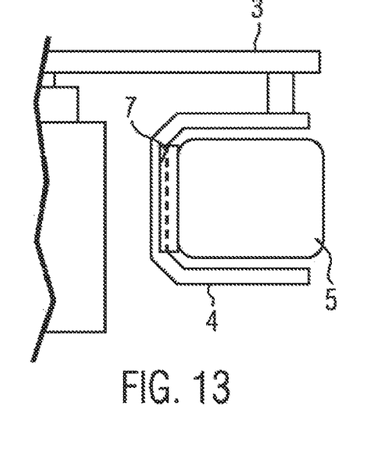
FIG. 13 shows a top view of the embodiment that is shown in FIGS. 10 to 12, whereby, however, the sealing element extends only along the tilting side of the receiving basket.

FIGS. 10 to 12 correspond to the respective FIGS. 1 to 3 and/or 5 to 7 and have a sealing element 7 and/or a sealing strip 7 that is fastened on the upper surface 4b of the receiving basket, whereby the sealing lip does not extend downwards as in FIG. 5 but upwards from a perspective in the direction of the meat trolley aperture. As can be seen from FIGS. 12 and 13, the sealing element can also in this case be formed either in a L- or U-shaped way or extend at least along the tilting side S1.

To implement a sealing between the meat trolley and the receiving basket, a sealing element that was fastened on the receiving basket 4 was described in the first three embodiments.

The sealing element 7 can also be formed as an inflatable element or for supporting sealing. This is particularly advantageous, since in meat trolleys with different geometries are used in different factories or meat trolley can have severy traces of use, i.e. they can be severely deformed. An inflatable sealing element, e.g. in the form of an inflatable hose, can ideally adapt to the outer contour of the meat trolley and thereby ensure a reliable sealing. It is also possible that the sealing element is not fully (i.g. not tightly) inflated before inserting the meat trolley, and once the meat trolley is fully inserted, which can be detected for instance by a switch or a lock or sensor, it can be fully inflated. The inflatable element can for instance be inflated up to a predetermined pressure and for this purpose it has a pneumatic connection. The inflatable element in this example is inflated by a gas, particularly by compressed air, however, it can also be inflated or filled by a liquid.

Figure 14:
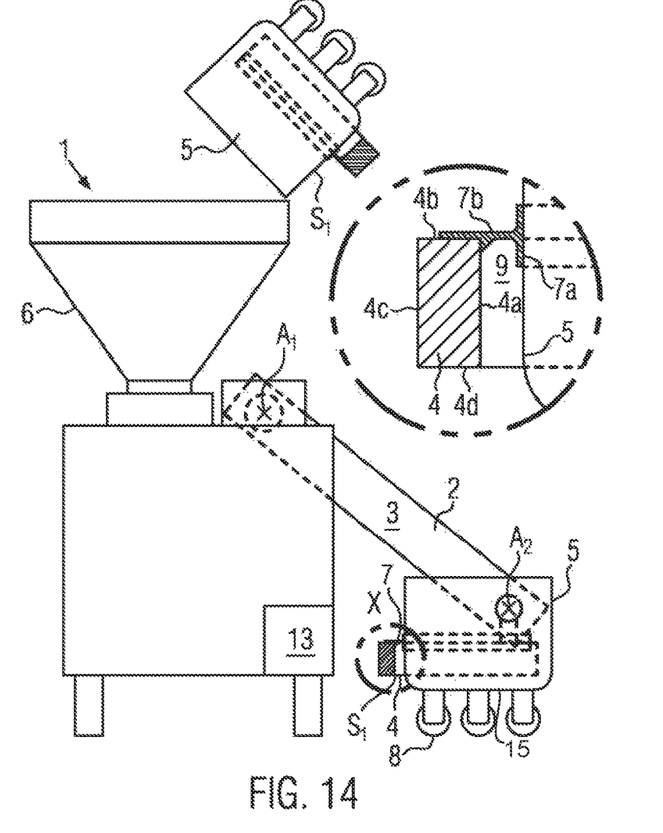
FIG. 14 shows a section through a further embodiment according to the present disclosure in which the sealing element is fastened on the meat trolley.
Figure 15:
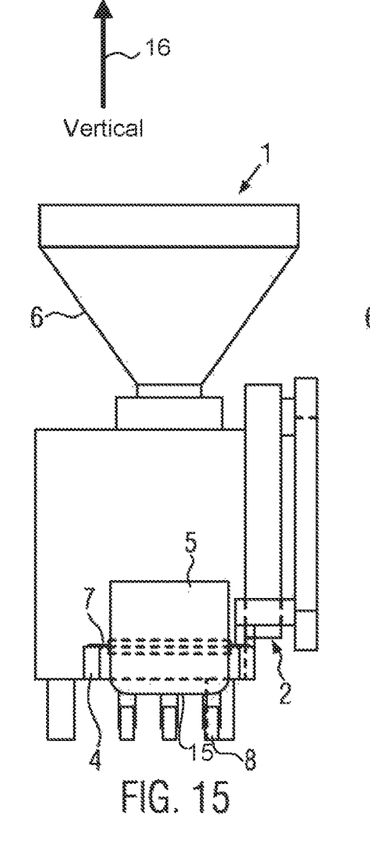
FIG. 15 shows a front view of the embodiment shown in FIG. 14.
Figure 16:
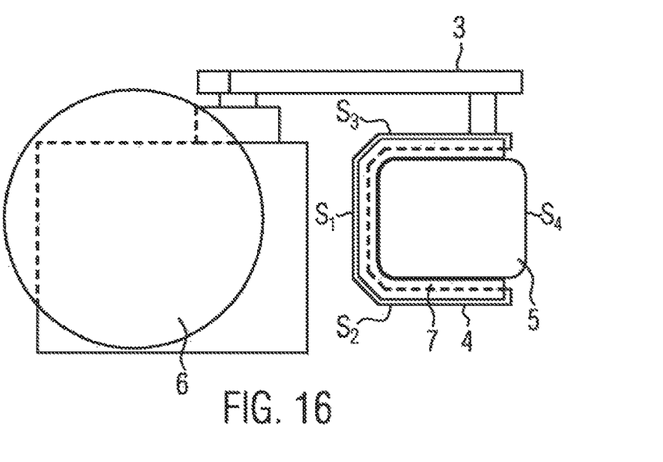
FIG. 16 shows a top view of the embodiment shown in FIGS. 14 and 15.

However, the sealing element can also be fastened on the meat trolley 5, as can be taken from FIGS. 14 to 17. As can be seen in FIG. 14, the sealing element 7 has a straight section 7a that is fastened on the container wall 5. From this section 7a, the crosspiece 7b branches off, which has a recess that receives the receiving basket, i.e. here a part of the upper surface 4b and the surface 4a that faces the meat trolley 5. Hence, the sealing element presses at least against one surface of the receiving basket in a way that a respective sealing is formed. Also here, a gutter 9 is formed.

Figure 17:
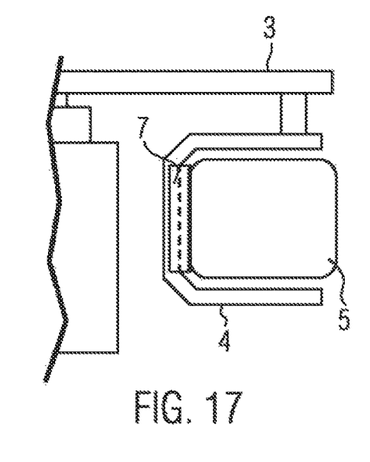
FIG. 17 shows a top view that corresponds to the embodiments of FIGS. 14 to 16, whereby the sealing element 4 extends only along the tilting side.

Just as in the other embodiments, this sealing element and/or this sealing strip is disposed at least on the side of the container 5 that corresponds to the tilting side. Thereby, the sealing element extends preferably over the total width of the meat trolley (FIG. 17). However, it is also possible for the respective sealing strip to extend around the meat trolley in a L- or U-shaped way or rather to enclose the overall meat trolley. This embodiment comes with the same advantages as described in connection with the first three embodiments.

In the method according to the present disclosure for feeding a food processing machine, here a filling machine, the following steps are to be provided.

Figure 19B:
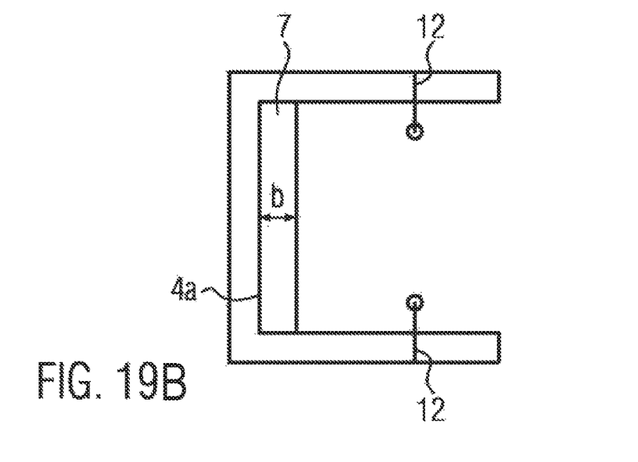
FIG. 19B corresponds to FIG. 19A without a meat trolley.

At first, the meat trolley filled with pasty substance is pushed to the filling machine 1 on the rollers 8. There is spray water on the floor of the meat trolley 15 and on the wheels 8. The meat trolley is fastened in the receiving basket 4 of the lifting device 2, for example through the lock and/or latch 12 and is therefore kept in a predetermined position. The meat trolley can then no longer fall out of the receiving basket 4. During insertion and/or fastening of the meat trolley 5, the sealing element 7, in particular the sealing strip, is slightly compressed, for example from a dimension b (see FIG. 19A, B) to a dimension a. Therefore, a sealing lip 11 can press against the respective meat trolley wall 5 in a way that a longish sealing point is formed. If the sealing element is fastened on the meat trolley 5, the sealing element will press against the receiving basket, e.g. a side surface 4a that is opposite to the meat trolley and/or a top side 4b and/or bottom side 4d of the receiving basket. The sealing point extends at least along the total width of the meat trolley 5 on the tilting side S1. Then, the meat trolley is lifted upwards by the lifting device, here the lifting arm 3, and swiveled around the axis A2 in a way that the aperture of the meat trolley 5 points towards the funnel 6 and that the meat trolley 5 can be emptied. As a gutter 9, which is now open towards the top, is formed between the receiving basket 4 and the meat trolley, the spray water from the floor of the meat trolley 15 can flow into the gutter 9 if the meat trolley is swiveled for emptying. Therefore, it can be ensured that this spray water cannot flow into the funnel 6.

If the sealing strip is open on its ends, the spray water can already drain away during the tilting process through the open ends of the strip and/or the gutter that is formed in the process. If this gutter and/or strip is formed at least sectionally in an inclined way as explained before in connection with FIG. 9, the spray water can flow out of the gutter even better, in particular also when the meat trolley is lowered. If the meat trolley 5 is back in its initial position, i.e. that its wheels 8 are facing downwards to the floor again, the remaining water can simply drain away in a downward direction because the gutter 9 is open towards the bottom in that case.

However, it is also possible as described before that the sealing strip 7 is closed on its open ends through closing elements 10a, 10b (FIG. 18). As the gutter 9 is opened upwards in a lifted, tilted position and closed towards the bottom and to the sides by means of the sealing strip and the closing elements 10a, 10b, no spray water can flow down from the gutter in this position. Only if the meat trolley 5 is once again swiveled around the axis A2 back towards the initial position, the spray water can be drained away in a downward direction onto the floor through the gutter 9.

If the empty meat trolley is lowered once again, it can be removed, i.e. unlocked and moved away. Therefore, spray water can be prevented in a simple way from flowing from the wheels and the bottom of a meat trolley into the funnel.

Figure 20:
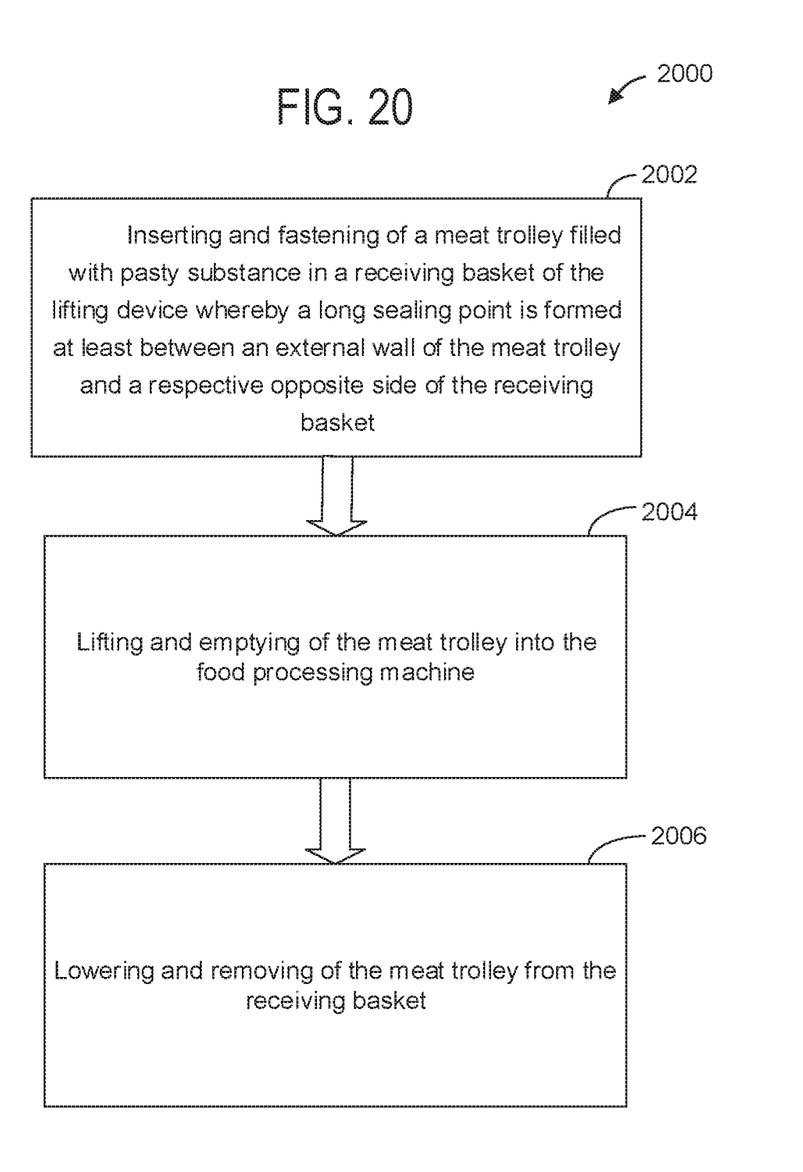
FIG. 20 shows a flow chart for an example method for feeding a food processing machine with a lifting device.

Turning now to FIG. 20, a flow chart for an example method 2000 for feeding a food processing machine, in particular a filling machine, with a lifting device is shown. Step 2002 of the example method includes inserting and fastening of a meat trolley filled with pasty substance in a receiving basket of the lifting device whereby a long sealing point is formed at least between an external wall of the meat trolley and a respective opposite side of the receiving basket. Next, step 2004 includes lifting and emptying of the meat trolley into the food processing machine. A gutter is formed between the receiving basket and the meat trolley into which spray water flows from a floor of the meat trolley while the latter, the meat trolley, is swiveled for emptying. Lastly, step 2006 of the example method comprises lowering and removing of the meat trolley from the receiving basket.

The invention claimed is:

1. A receiving basket for a lifting device of a food processing machine that receives a meat trolley,
    wherein the receiving basket is formed as a U-shaped support structure with an open end for receiving the meat trolley and has a sealing element fastened thereon,
    wherein the sealing element contacts at least one external wall of the meat trolley facing the U-shaped support structure and the sealing element extends at least along a tilting side of the meat trolley,
    wherein the sealing element extends along one of:
        a side surface of the U-shaped support structure that faces the meat trolley,
        an upper surface of the U-shaped support structure, and
        a lower surface of the U-shaped support structure,
    wherein the sealing element is compressed by the at least one external wall of the meat trolley facing the U-shaped support structure creating a long sealing point formed at least between the external wall of the meat trolley and a respective side of the U-shaped support structure, and
    wherein the meat trolley is fastened in the receiving basket by a lock and/or a latch.

2. The receiving basket according to claim 1, wherein a flexible material of the sealing element is from a group of elastomers.

3. The receiving basket according to claim 1, wherein the sealing element has a flexible sealing lip.

4. The receiving basket according to claim 1, wherein the receiving basket is formed as the U-shaped support structure, whereby the sealing element extends at least along one of three sides S1, S2, and S3 of the U-shaped support structure.

5. The receiving basket according to claim 1, wherein the sealing element is formed as a sealing strip that is formed at least in part of a flexible material.

6. The receiving basket according to claim 5, wherein the sealing strip is formed in such a way that a gutter is formed between the receiving basket and the meat trolley.

7. The receiving basket according to claim 6, wherein the gutter extends at least in sections at an angle α in relation to a longitudinal axis of a respective side S1, S2, and S3 of the receiving basket.

8. The receiving basket according to claim 6, wherein the sealing strip has sealing elements that seal the gutter laterally.

9. The receiving basket according to claim 6, wherein the gutter extends along an overall width of a meat trolley side.

10. The receiving basket according to claim 1, wherein the sealing element is installed in a replaceable way.

11. The receiving basket according to claim 1, where the lifting device is for receiving, lifting, and emptying of the meat trolley into the food processing machine with a drive and a lifting element, and where the receiving basket is connected to the lifting element for receiving the meat trolley.

12. The receiving basket according to claim 11, wherein the food processing machine is a filling machine for filling of a pasty substance with a funnel to fill the pasty substance and a conveyor system to convey the pasty substance with the lifting device.

13. The receiving basket according to claim 1, wherein a latching device is provided that locks and fastens the meat trolley in a way that a side surface of the meat trolley has a predetermined distance from a surface of the receiving basket that faces a container, and where the sealing element has a width when the meat trolley is installed that is larger than a distance when the meat trolley is not installed.

14. The receiving basket according to claim 1, wherein the sealing element is formed as an inflatable element.

15. A receiving basket system for a lifting device of a food processing machine comprising a receiving basket that receives a meat trolley,
   wherein the receiving basket is formed as a U-shaped support structure with an open end for receiving the meat trolley and the meat trolley has a sealing element on at least one external wall which is laid onto at least one side of the receiving basket,
   wherein the sealing element contacts the U-shaped support structure of the side of the receiving basket facing the at least one external wall of the meat trolley and the sealing element extends at least along a tilting side of the meat trolley,
   wherein the sealing element on the at least one external wall of the meat trolley is laid onto the at least one side of the receiving basket to create a long sealing point formed at least between the at least one external wall of the meat trolley and a respective side of the U-shaped support structure, and
   wherein the meat trolley is fastened in the receiving basket by a lock and/or a latch.

16. The receiving basket system according to claim 15, wherein the sealing element of the meat trolley is disposed in a lower third of the meat trolley.

* * * * *